United States Patent
Versteijnen

[11] Patent Number: 6,056,829
[45] Date of Patent: May 2, 2000

[54] MILK TANK CLEANING METHOD AND STORAGE FACILITY FOR CARRYING OUT THAT METHOD

[75] Inventor: Carolus Marinus Bernard Versteijnen, Groningen, Netherlands

[73] Assignee: Alfa Laval Agri AB, Tumba, Sweden

[21] Appl. No.: 09/065,068

[22] PCT Filed: Oct. 27, 1995

[86] PCT No.: PCT/EP95/04272

§ 371 Date: Jun. 1, 1998

§ 102(e) Date: Jun. 1, 1998

[87] PCT Pub. No.: WO97/16266

PCT Pub. Date: May 9, 1997

[51] Int. Cl.[7] .............................. B08B 3/00; B08B 9/00
[52] U.S. Cl. .................... 134/26; 134/22.1; 134/29; 134/30; 134/166 C; 134/169 C; 134/169 R
[58] Field of Search .................... 134/22.19, 22.1, 134/22.18, 26, 36, 166 R, 169 R, 169 C, 166 C, 57 R, 58 R, 29, 30

[56] References Cited

U.S. PATENT DOCUMENTS

| | | | |
|---|---|---|---|
| 2,680,445 | 6/1954 | Hemminger | 134/58 R |
| 3,814,291 | 6/1974 | Van Zufphen et al. | |
| 3,860,018 | 1/1975 | Reiter | |
| 3,916,923 | 11/1975 | Branton | 134/57 R |
| 4,015,618 | 4/1977 | Schmid | 137/93 |
| 4,208,219 | 6/1980 | Etscheid | 134/57 R |
| 5,405,452 | 4/1995 | Anderson et al. | 134/22.12 |

FOREIGN PATENT DOCUMENTS

| | | |
|---|---|---|
| 8280975 | 1/1977 | Australia . |
| 0603150 | 11/1993 | European Pat. Off. . |
| 2302793 | 10/1976 | France . |
| 2459084 | 1/1981 | France . |
| 2446686 | 8/1990 | France . |

*Primary Examiner*—Randy Gulakowski
*Assistant Examiner*—Saeed Chaudhry
*Attorney, Agent, or Firm*—Hovey, Williams, Timmons & Collins

[57] ABSTRACT

Cleaning a milk tank includes rinsing the tank with cold water and washing the tank with a warm liquid. During rinsing, the tank is finally rinsed with substantially warmer water than the cold water with which the tank is initially rinsed, the cold water being cold enough to remove milk residues such as proteins, from the milk tank. A dairy farm milk storage facility specifically adapted for carrying out this method is also described. Milk residues such as proteins are effectively rinsed away by the initially used cold water and no energy is consumed for heating this rinsing water. Subsequently the storage tank is gradually, evenly and very effectively pre-warmed by the final rinsing water prior to the washing stage, so less washing water is required to achieve the required washing temperature while thermal stresses occurring in the tank are kept low.

18 Claims, 1 Drawing Sheet

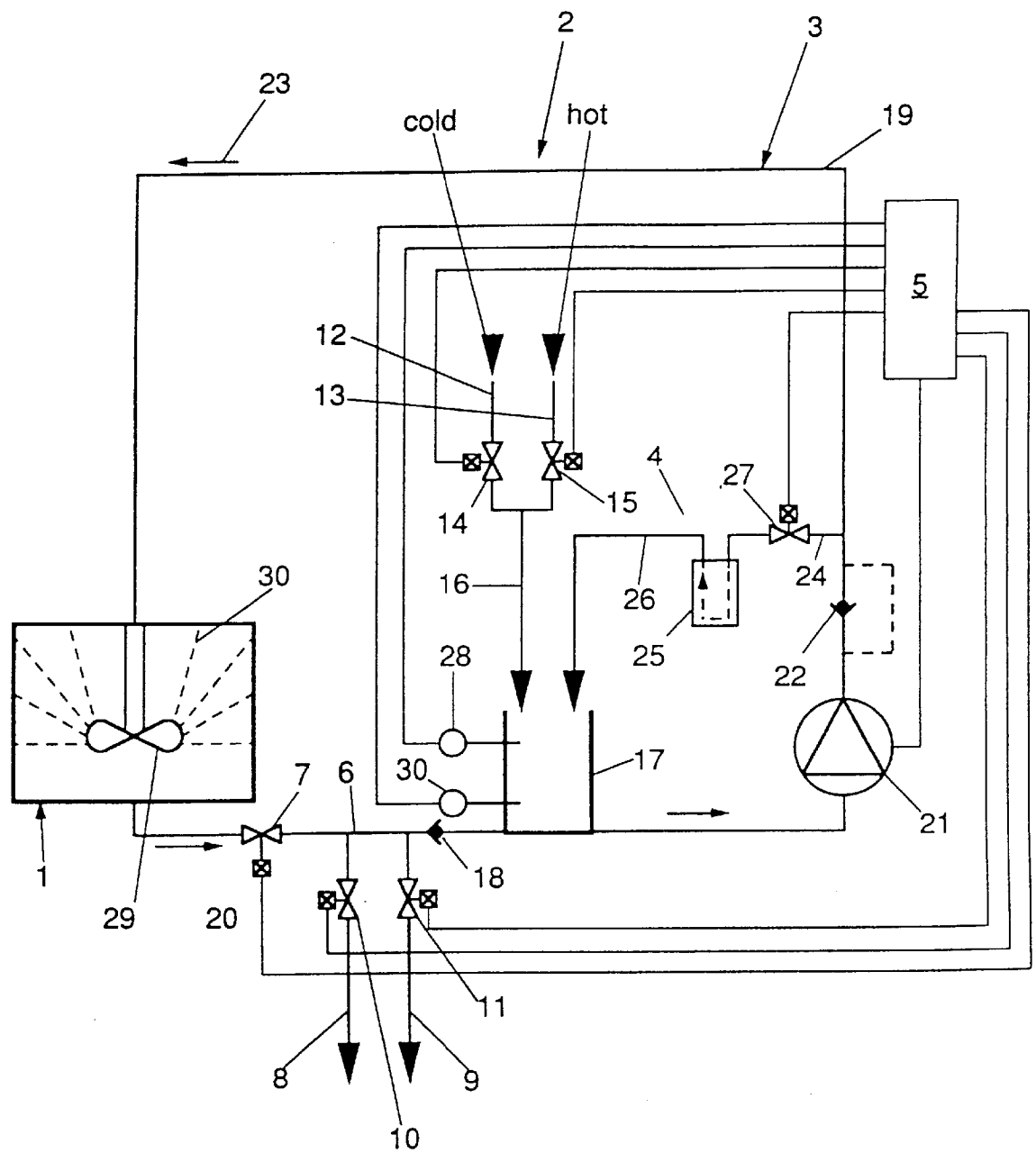

MILK TANK CLEANING METHOD AND STORAGE FACILITY FOR CARRYING OUT THAT METHOD

BACKGROUND OF THE INVENTION

1. Field of the Invention

The invention relates to a method of cleaning the inside of a milk tank, including the stages of rinsing the tank with cold water and subsequently washing the tank with a warm aqueous liquid containing a cleaning agent.

The invention also relates to a dairy farm milk storage facility including a tank and a cleaning system. The cleaning system includes a water supply structure communicating with the tank for supplying warm and cold water to the tank, a dispensing device communicating with the water supply structure for admixing a cleaning agent to the water and a control unit operatively connected to the water supply structure and to the dispensing device for controlling the water supply structure and the dispensing device. The control unit is programmed for conducting a cleaning program including the stages of rinsing the tank with cold water and subsequently washing the tank with a liquid including hot water and a cleaning agent.

2. Description of the Prior Art

Such a method and such a storage facility are disclosed in French patent application 2 446 686. The method according to this document is intended for automatically cleaning tanks for storing food products such as milk. The cleaning is carried out in the form of a three-stage cleaning cycle which includes the earlier mentioned two stages of rinsing and washing and a third stage of rinsing. During the washing stage generally up to 40 liters of lukewarm water previously gathered in a buffer reservoir are pumped into the storage tank and recirculated for a predetermined period of time.

Milk storage tanks are typically made of stainless steel, thermally insulated and maintained at a temperature of about 4° C. for storing the milk at that temperature. Even after the rinsing of the tank, the tank is therefore still very cold. One disadvantage of the known system is that a large volume of the lukewarm washing mixture is required to obtain an effective washing water temperature of at least 40° C. during the washing stage. This entails a correspondingly high consumption of water and also of cleaning agent which has to be admixed in a predetermined proportion.

Moreover, the instantaneous introduction of large amounts of warm washing water into the tank, leads to substantial thermal stress in the tank every day or every other day when the tank is cleaned after having been emptied and is detrimental to the cooling system. The more the washing water is heated before introduction into the cold tank, the larger are the thermal stresses caused in the tank. This in turn may lead to the formation of cracks in the tank. Such cracks may occur directly or, due to fatigue, after some time. Cracks in the walls of the tank have a detrimental effect upon the hygienic conditions in the tank, because cleaning the inside of such cracks is virtually impossible.

In some systems known from practice, it is known to rinse the tank with lukewarm water instead of with cold water. In such systems the temperature of the rinsing water is lower than the temperature of the washing water to avoid coagulation of milk residues, and in particular proteins, which have been left behind as the stored milk was discharged from the milk tank. Coagulation of milk residues causes the milk residues to clog up and to adhere to the walls of the tank more strongly, which makes it more difficult to remove these residues from the milk tank. Nevertheless, dependent on the temperature of the washing water, some coagulation has been observed and the extent to which the tank is found to be pre-warmed is only limited.

In French patent application 2 459 084 a tank cleaning system is disclosed which allows to carry out a heating phase by successive and progressive injections of small quantities of warm water to progressively preheat the tank to be cleaned. A pressure sensor is arranged in the buffer reservoir to dose the quantities of water introduced into the buffer reservoir.

Such a heating phase increases the duration and the complexity of the cleaning program. Therefore the downtime of the milk storage facility each time after the stored milk has been collected by the milk truck is prolonged. Furthermore, this system is complicated because special dosing means in the form of a pressure sensor are provided for dosing the predetermined small quantities of warm water.

SUMMARY OF THE INVENTION

It is an object of the invention to provide a cleaning method by which the tank can be washed at a given temperature with less washing water of a given (higher) entry temperature, without increasing the extent to which coagulation of milk residues occurs during the rinsing stage and which causes less thermal stress in the tank.

According to the invention this object is achieved by a method of the above-described type in which, during the rinsing stage, the tank is finally rinsed with substantially warmer water than the cold water with which the tank is initially rinsed during the rinsing stage, the cold water being cold enough to remove milk residues, such as proteins, from the milk tank.

Initially, milk residues such as proteins are effectively removed by the cold water which is initially used, because coagulation of the milk residues and increased adherence of these residues to the milk tank is avoided. Subsequently, the storage tank is gradually, evenly and effectively pre-warmed by the final rinsing water prior to the washing stage, so less washing water and commensurately less cleaning agent is required to achieve the desired effective washing temperature. Accordingly, water consumption and emissions of processed cleaning agent, i.e. pollution, are substantially reduced.

Because most milk residues have already been removed towards the end of the rinsing stage, warmer rinsing water can be used at the end of the rinsing stage than in conventional methods using lukewarm rinsing water. Thus a very effective pre-warming of the tank is achieved. The tank is also pre-warmed more efficiently than in conventional methods using lukewarm rinsing water, because less water is warmed to a higher temperature so a more efficient heat transfer to the tank is obtained.

Even at higher temperatures of the rinsing water, thermal stress occurring in the tank is reduced, because the rinsing water is typically sprayed uniformly through the tank, so the tank is warmed uniformly.

A further advantage of rinsing with warm water at the end of the rinsing stage is that not only the tank but also upstream conduits through which the washing water is supplied are pre-warmed. Cold water in the conduits upstream of the tank is replaced by warm water at the end of the rinsing stage, so relatively warm water is fed into the tank from the very beginning of the washing stage. This also contributes to achieving the required effective washing temperature with relatively little washing water and without increasing the temperature of the water at the exit of the water heating device.

A further object of the invention is to provide a facility which is specifically adapted for carrying out such a method.

According to the invention, this object is achieved by providing a facility of the above described type, in which the control unit is programmed for controlling the water supply structure such that, during the rinsing stage, finally rinsing water is supplied which is substantially warmer than the cold water with which the tank is initially rinsed.

Further details and advantages of the method and the system according to the present invention appear from the following description of particular modes for carrying out the invention, the drawing and the claims.

BRIEF DESCRIPTION OF THE DRAWING

The drawing shows a schematic representation of an embodiment of a facility for storing milk according to the invention.

DESCRIPTION OF THE PREFERRED EMBODIMENTS

The dairy farm milk storage facility shown in the drawing comprises a milk storage tank 1 in which milk obtained during milking in a dairy farm can be stored temporarily until the milk is collected by a milk truck. The milk is usually collected every day or every other day. The skilled person will appreciate that the milk storage tank 1 is provided with connections for supplying milk from a milking parlour to the milk storage tank 1 and for emptying the milk storage tank 1. As these connections can be provided in a conventional form well known in the art, these connections are not shown.

After emptying such a milk storage tank, the tank is usually cleaned. To clean the milk storage tank 1 automatically, the storage facility is provided with a cleaning system 2.

The cleaning system 2 is provided with a water supply structure 3 communicating with the milk storage tank 1 for supplying warm and cold water to the milk storage tank 1. For admixing a detergent to the water to be used for cleaning the tank, the cleaning system 2 is provided with a dispensing device 4 communicating with the water supply structure 3. A control unit 5 is connected to the water supply structure 3 and to the dispensing device 3 for controlling the supply of water and detergent.

An upstream part of the water supply structure 3 is formed by cold and hot water supply conduits 12 and 13. The conduit 12 is connected to the mains. The conduit 13 is connected to an upstream hot water apparatus (not shown), which in turn is connected to the mains. Valves 14, 15 are arranged in the cold and hot water supply conduits 12 and 13. The valves 14, 15 are connected to and operable by the control unit 5. The cold and hot water supply conduits 12 and 13 merge into a common water supply conduit 16. The water supply conduit 16 opens into a buffer reservoir 17. The buffer reservoir 17 is provided with an upper liquid level sensor 28 and a lower liquid level sensor 30. Both these sensors 28, 30 are connected to the control unit 5 for signalling whether the liquid level in the buffer reservoir 17 is above or below the respective sensor 28 or 30.

The buffer reservoir 17 communicates with a draining conduit 6 which is connected to the milk storage tank 1. Via the draining conduit 6, liquid drained from the milk storage tank 1 can be recirculated to the buffer reservoir 17 or be discharged. A draining valve 7 is arranged in the draining conduit 6 for selectively closing off and opening the discharge conduit 6. To allow selective re-use of water drained from the tank 1, two discharge conduits 8, 9 are branched off the draining conduit 6. The first one of the conduits 8 can, for example, be connected to a dispensing system from which cattle can drink, while the other one of the conduits 9 can, for example, be connected to an effluent conduit. Valves 10, 11 are arranged in the conduits 8, 9 and connected to the control unit 5, so the discharge of fluids drained from the milk storage tank 1 can be controlled by the control unit 5. The draining conduit 6 is provided with a one-way valve 18 between the branches 8, 9 and the buffer reservoir 17. The one-way valve is mounted so as to prevent water from passing directly from the buffer reservoir 17 into the drain conduit 6 and towards the discharge conduits 8, 9. Thus, water can only be passed through the drain conduit in the direction of the arrow 20.

The buffer reservoir 17 further communicates with a feeding and recirculating conduit 19 interconnecting the buffer reservoir 17 with the milk storage tank 1. A pump 21 and a one-way valve 22 downstream of the pump 21 are arranged in the feeding and recirculating conduit 19. The one-way valve 22 in the feeding and recirculating conduit 19 is mounted so as to prevent water from flowing in a direction opposite to the direction indicated by the arrow 23.

The dispensing device 4 comprises a recirculating conduit 24 branching off from a section of the feeding and recirculating conduit 19 downstream of the pump 21, a dosing reservoir 25 and a dispensing conduit 26 opening into the buffer reservoir 17. In the recirculating conduit 24 a valve 27 connected to the control unit 5 is provided for opening and closing off the recirculating conduit 24.

The feeding and recirculating conduit 19 has an orifice in the tank 1 in the form of a rotatable nozzle 29 designed to rotate if a liquid is sprayed through the nozzle and to form concentrated jets 30, preferably in the form of flat jets, which rotate along the wall of the tank 1.

The control unit 5 is programmed for conducting a cleaning program comprising the stages of rinsing the milk storage tank 1 with water, subsequently washing the milk storage tank 1 with a mixture of hot water and detergent and, finally, again rinsing the milk storage tank 1.

In the cleaning system shown in the drawing, this is achieved as follows. When the cleaning system 2 is not in operation, all the valves 7, 8, 9, 14, 15, 27 of the cleaning system 2 which are operable by the control unit 5 are preferably in a "normally closed" condition to minimize the risk of milk entering the cleaning system 2 or liquid from the cleaning system 2 entering the tank 1 in case a valve is defective. Furthermore, the buffer reservoir 17 as well as at least a part of the feeding and recirculating conduit 19 contain fresh water.

When the rinsing stage is started, the valves 7 and 10 are opened and the pump 21 is activated. Water previously stored in the buffer reservoir 17 and the conduit 19, for a typical milk storage tank preferably about 2 to 4 litres, is forced through the feeding and recirculating conduit 19 and sprayed into the tank 1 via the nozzle 29. The nozzle 29 is designed such that the available amount of water causes the nozzle 29 to rotate at least 360° or correspondingly less if the nozzle 29 generates more jets distributed in the direction of rotation.

Subsequently, the pump 21 is deactivated by the control unit 5 in response to a signal from the lower liquid level detector 30 indicating that the water level in the buffer tank 17 is below the lower liquid level detector 30. The water sprayed into the tank 1 together with milk residues rinsed from the interior of the tank 1 are drained via the draining conduit 6 and the discharge conduit 8 to the dispensing device from which cattle can drink. Shortly after the pump 21 has stopped, the valve 14 in the cold water supply conduit 12 is opened to refill the buffer reservoir 17 up to a level determined by the upper liquid level sensor 28. In response to a signal from the upper liquid level sensor 28 indicating that the water level has reached that sensor, the control unit 5 deactivates the valve 14 in the cold water supply conduit 12, so this valve 14 is closed again shortly after the water has reached the upper liquid level sensor 28. While the buffer reservoir 17 is being refilled, the tank 1 is left to drain via the draining conduit 6 and the discharge conduit 8.

A next rinsing cycle is started by again activating the pump 21. The valves 7 and 10 can be left open during the entire rinsing stage. The rinsing cycle may, for example, be repeated eight times for rinsing a milk tank of average volume.

The temperature of the cold water direct from the mains will virtually always be lower than 30° C., will generally be lower than 20° C. and is typically between 4° C. and 10° C., i.e. virtually always cold enough to keep coagulation of milk residues, such as proteins, to a minimum. These residues are therefore removed effectively by the cold water since the proteins are not warmed up to an extent which would promote clogging and adherence to the walls of the milk storage tank 1. Furthermore, no energy is consumed for warming up this rinsing water.

The control unit 5 is further programmed for controlling the water supply structure 3, such that, during the rinsing stage, the milk storage tank 1 is finally rinsed with substantially warmer rinsing water than the cold water with which the milk storage tank 1 is initially rinsed. In the present example this is achieved by filling the buffer reservoir 17 with warmer water prior to at least the last rinsing cycle.

To supply warm water to the buffer reservoir for at least this last rinsing cycle, the control unit 5 is programmed to open the valve 15 in the hot water supply conduit 13 during at least the filling of the buffer reservoir 17 prior to the last rinsing cycle of this rinsing stage.

In operation, the milk storage tank 1 is pre-warmed by the warmer rinsing water, which is introduced into the milk storage tank 1 at the end of the rinsing stage. The heat stored in the rinsing water rinsing the walls of the tank 1 is gradually and evenly transferred to the walls of the milk storage tank 1, so thermal stresses caused in the milk storage tank 1 are kept at a relatively low level, even if extraordinarily hot water is used.

Since the milk storage tank 1 is very effectively warmed at the end of the rinsing stage, relatively little washing water and correspondingly little cleaning agent are required during a subsequent washing stage to achieve the required effective washing temperature (typically about 40° C.). Alternatively, a relatively high effective washing temperature can be achieved at a given volume of washing water of a given temperature. At the same time thermal stress occurring in the milk storage tank 1 is kept low because the difference in temperature between the washing water and the pre-warmed tank 1 is relatively small.

At the start of the washing stage, the valves 7 and 10 are closed and about 25 to 30 liters of the warm water are fed to the tank 1. This can be achieved by filling the buffer reservoir 17 and activating the pump 21 a predetermined number of times. It is also possible to open the valve 15 in the hot water supply conduit 13 for a predetermined period of time while the pump 21 is running. The valve 27 in the recirculating conduit 24 of the dispensing device 4 is opened, so a portion of the water supplied by the pump 21 is recycled via the dispensing device 4. The water recirculated via the dispensing device is passed through the recirculating conduit 24, the dosing reservoir 25 and the dispensing conduit 26 opening into the buffer reservoir 17. A cleaning agent the dosing reservoir 25 has previously been supplied with is entrained by the water, recirculated via the dispensing device and admixed to water in the buffer reservoir 17 and introduced into the milk storage tank 1 with warm water pumped from the buffer reservoir 17 to the milk storage tank 1.

It is noted that a particularly suitable system and method for automatically dispensing a cleaning agent in a system associated with a milking plant are disclosed in international patent application publication no. WO 94/23564.

Since the valve 7 is closed during the filling of the tank 1, the hot washing liquid is collected in a lower part of the tank 1. Because the tank has been effectively pre-warmed, this does not lead to excessive thermal stresses between that lower part of the tank and the rest of the tank.

Because at the end of the rinsing stage, not only the tank 1 but also upstream conduits 16, 19 and the buffer reservoir 17 through which the washing water is supplied are effectively pre-warmed, and cold water in the conduits 16, 19 and the buffer reservoir 17 upstream of the tank 1 is replaced by hot water, relatively warm water is fed into the tank 1 from the very beginning of the washing stage. This also contributes to achieving a high effective washing temperature at a given nominal temperature of the hot water as it is supplied via the hot water conduit 13 in a steady state condition.

After the tank 1 has been filled with sufficient cleaning liquid, the cleaning liquid is recirculated through the milk storage tank 1. To achieve this, the control unit is programmed to open the valve 7 and to activate the pump 21 after the tank 1 has been filled with the required amount of cleaning liquid.

After the cleaning liquid has recirculated for a predetermined period of time, the control unit opens the valve 11 in the discharging conduit 9, so the cleaning liquid is discharged, preferably to a reuse installation.

Finally, the tank is again rinsed during a further rinsing stage. During this rinsing stage, only cold water can be used, so the tank is gradually cooled by the cold rinsing water. It is also possible to initially rinse with warmer water in order to remove the cleaning agent more quickly. Preferably, the water is also recirculated during this further rinsing stage by initially keeping the valves 10 and 11 in the discharge conduits 8, 9 closed at the beginning of each rinsing cycle. Thus, the cleaning agent is also effectively removed from the cleaning system 2.

At least during the filling of the buffer reservoir 17 prior to the very last rinsing cycle before the washing stage, the valve 14 in the cold water supply conduit 12 is preferably left closed, so the temperature of the rinsing water finally supplied to the milk storage tank 1 during the rinsing stage is essentially the same as the temperature of the water included in the aqueous liquid supplied to the milk storage tank 1 during the washing stage following this rinsing stage.

During filling of the buffer reservoir 17 with warm water, the valve 14 in the cold water supply conduit 12 can be opened to obtain rinsing water of a temperature lower than the temperature of the water supplied via the hot water conduit 13. By shortening the opening time of the valve 14 in the cold water supply conduit 12 step by step during successive rinsing cycles, the temperature of the rinsing water for successive rinsing cycles prior to the washing cycle can be increased step by step, so that a very gradual warming of the milk tank 1 is achieved.

A particularly gradual pre-warming of the milk storage tank 1 can be achieved if, for at least the last two batches of rinsing water, the difference in temperature between each batch and the respective preceding batch is substantially the same.

To achieve this, the control unit 5 can be provided with a timer and be programmed for opening the valve 15 in the hot water supply conduit 13 for increasing periods of time during at least the supply of the last two batches of water of the rinsing stage to the buffer reservoir 17.

However, since during rinsing the water supplied to the milk storage tank 1 is directly drained, the amount of rinsing water flushed through the milk storage tank 1 during a last part of the rinsing stage is relatively small compared with the amount of water introduced into the milk storage tank 1 at the beginning of the washing stage. Typically, the washing water fills up a lower part of the milk storage tank 1 which, in the prior art devices, was warmed up much more quickly than the rest of the milk storage tank. The relatively small amounts of rinsing water which are directly drained do not lead to the formation of a pool of liquid in the bottom of the milk storage tank and accordingly little thermal energy is stored in the rinsing water present in the milk storage tank at any time during the final part of the rinsing stage. Thus, the rinsing water will generally provide a much more uniform and gradual transfer of heat to the milk storage tank 1 than the washing water.

Even if the control unit 5 is programmed for exclusively activating the cold water supply 12, 14 or the hot water supply 13, 15, so after one or more rinsing cycles during which only cold water was used, only the valve 15 in the hot water supply conduit 13 is opened to fill the buffer reservoir 17, the rinsing water provides a much more uniform and gradual transfer of heat to the milk storage tank 1 than warm washing water fed into a tank which has not or not sufficiently been pre-warmed. Moreover, since the conduits 13, 16, 19 and the buffer reservoir 17 are still cold and even contain some cold water when hot water is supplied for the first time during the rinsing stage, the effective temperature of the rinsing water supplied to the tank 1 during the first rinsing cycle after hot water has been filled into the buffer reservoir 17 is substantially lower than the effective temperature of the rinsing water during later rinsing cycles or at least lower than the temperature of the washing water which has been supplied via pre-warmed conduits and reservoirs. Thus, the temperature of the rinsing water is increased gradually, even if a direct switch is made from feeding cold water to feeding warm water.

Since directly switching from feeding only cold water to feeding only warm water provides the advantage of most effectively minimizing coagulation at the beginning of the rinsing stage and most effectively heating up the tank at the end of the rinsing stage, it is preferred to feed only cold water to the buffer reservoir 17 for a first rinsing cycle or for each of a first number of rinsing cycles and to feed only hot water to the buffer reservoir 17 for the remaining rinsing cycle or cycles. Directly switching from feeding only cold water to feeding only warm water also provides a particularly efficient heat transfer to the milk tank 1.

A further advantage of exclusively feeding hot water into the buffer reservoir 17 for the last rinsing cycle or cycles is that the milk storage tank 1 is pre-warmed to a temperature very close to the temperature of the washing liquid, which consists of hot water supplied from the same hot water supply and the cleaning agent. Thus, the thermal stresses caused by the pool of hot washing water which is formed in a bottom part of the milk storage tank 1 at the beginning of the washing stage are kept correspondingly low.

To obtain an effective pre-warming of the milk storage tank 1, it is further preferred that more than one last batches of rinsing water are warmer than the first batch. More in particular, it is preferred to feed hot water to the buffer reservoir 17 during the supply of at least the last one-third of the batches supplied to the buffer reservoir 17 during the rinsing stage. The control unit 5 can, for example, be set such that eight rinsing cycles are carried out before the washing stage, and exclusively hot water is fed by only opening the valve 15 in the hot water supply conduit 13 during the supply of water for and prior to each of the last four rinsing cycles.

Feeding a number of batches of rinsing water to the milk storage tank 1 during the rinsing stage is advantageous in that it allows a simple and reliable control of the quantity of supplied warm rinsing water and time can be gained because the buffer reservoir 17 can each time be refilled while the rinsing water sprayed into the tank 1 during the previous rinsing cycle is left to drain from the tank 1. Within the framework of the present invention, however, it is also possible to choose other manners of feeding the rinsing water. It is, for instance, possible to feed cold rinsing water and recirculate it along a heater. It is also possible to feed the rinsing water in the form of a continuous flow which is drained directly after having passed the milk storage tank and of which the temperature is increased by changing the mix of hot and cold water or by operating a heating device.

What is claimed is:

1. A method of cleaning the inside of a milk tank, including the stages of rinsing the tank with cold water of a temperature to cause removal of milk residues from the milk tank and subsequently washing the tank with a warm liquid that is substantially warmer than the cold water and contains at least one cleaning agent, including finally rinsing said tank during said rinsing stage with substantially warmer water than the cold water with which the tank is initially rinsed during said rinsing stage.

2. A method according to claim 1, wherein the liquid initially supplied to the tank during the washing stage is a mixture of the cleaning agent or agents and hot water of a temperature equal to or greater than the warm liquid.

3. A method according to claim 1, wherein, during rinsing, the water supplied to the tank is directly drained and during washing the liquid supplied to the tank is recirculated.

4. A method according to claim 3, wherein, during the rinsing stage, a number of batches of rinsing water are fed to the tank, at least the last of said batches being warmer than the first of said batches.

5. A method according to claim 4, wherein during the rinsing stage a number of batches of rinsing water are fed to the tank, at least a plurality of last batches being warmer than the first batch.

6. A method according to claim 4, wherein, for at least the last two batches of rinsing water, the temperature difference between each batch and the respective preceding batch is substantially the same.

7. A method according to claim 1, wherein the temperature of the rinsing water finally supplied to the tank during the rinsing stage is essentially the same as the temperature of the liquid supplied to the tank during the washing stage.

8. A method according to claim 6, wherein the rinsing water finally fed to the tank during the rinsing stage and water forming a component of said liquid fed to the tank during the washing stage are both exclusively hot water of a temperature equal to or greater than the warm liquid, said hot water being supplied from a common source.

9. A dairy farm milk storage facility comprising:

a tank;

a cleaning system, said cleaning system comprising a water supply structure communicating with the tank for supplying cold water of a temperature to cause removal of milk residues from the tank and substantially warmer water to the tank;

a dispensing device communicating with the water supply structure for admixing a cleaning agent to the water;

a control unit operatively connected to said water supply structure and to said dispensing device for controlling the water supply structure and the dispensing device, said control unit being programmed for conducting a cleaning program comprising the stages of rinsing the tank with the cold water and subsequently washing the tank with a warm liquid comprising at least one cleaning agent and hot water of a temperature equal to or greater than the warm liquid, wherein the control unit is programmed for controlling the water supply structure in such a manner that, during the rinsing stage, final rinsing water is supplied which is substantially warmer than the cold water with which the tank is initially rinsed.

10. A storage facility according to claim 9, wherein the water supply structure comprises a cold water supply for supplying the cold water and a hot water supply for supplying the hot water, with the cold and hot water supplies being operatively connected to the control unit, the control unit being programmed for exclusively activating the cold water supply during an initial phase of the rinsing stage and for activating the hot water supply during a final phase of the rinsing stage.

11. A storage facility according to claim 10, wherein the control unit is programmed for exclusively activating the hot water supply at least during a final phase of the rinsing stage.

12. A storage facility according to claim 11, wherein the control unit is programmed for exclusively activating either the cold water or the hot water supply.

13. A storage facility according to claim 10, wherein the control unit is programmed for activating the hot water supply during the supply of at least the last one-third of the batches supplied to the buffer reservoir during the rinsing stage.

14. A storage facility according to claim 10, wherein the control unit comprises a timer and is programmed for activating the hot water supply for increasing periods of time during at least the supply of the last two batches of water of the rinsing stage to the buffer reservoir.

15. A storage facility according to claim 13, wherein the control unit comprises a timer and is programmed for activating the hot water supply for increasing periods of time during at least the supply of the last two batches of water of the rinsing stage to the buffer reservoir.

16. A storage facility according to claim 9, wherein the water supply structure further comprises a buffer structure comprising a buffer reservoir provided with at least one liquid level sensor and at least one valve in a water supply conduit upstream of the buffer reservoir, said valve being operatively connected to said water level sensor and a pump downstream of said buffer structure, said control unit being operatively connected to said pump and said buffer structure and program for repeatedly conducting a cycle of filling said buffer reservoir with a batch of water up to a level determined by said water level sensor and subsequently activating said pump during said rinsing stage, and for conducting the water supply structure such that during said rinsing stage at least a final batch of water supplied to the buffer reservoir is warmer than an initial batch of water supplied to the buffer reservoir.

17. A storage facility according to claim 16, wherein the control unit is programmed for activating the hot water supply during the supply of at least the last one-third of the batches supplied to the buffer reservoir during the rinsing stage.

18. A storage facility according to claim 16, wherein the control unit comprises a timer and is programmed for activating the hot water supply for increasing periods of time during at least the supply of the last two batches of water of the rinsing stage to the buffer reservoir.

* * * * *